Oct. 31, 1967   J. L. BOYEN   3,349,548
CYCLONE SEPARATOR FOR SEPARATING STEAM FROM WATER
Filed Jan. 22, 1964   2 Sheets-Sheet 1

INVENTOR.
JOHN L. BOYEN
BY
Townsend & Townsend
ATTORNEYS

Oct. 31, 1967     J. L. BOYEN     3,349,548
CYCLONE SEPARATOR FOR SEPARATING STEAM FROM WATER
Filed Jan. 22, 1964     2 Sheets-Sheet 2

INVENTOR.
JOHN L. BOYEN
BY
Townsend & Townsend
ATTORNEYS

U̇nited States Patent Office 3,349,548
Patented Oct. 31, 1967

3,349,548
CYCLONE SEPARATOR FOR SEPARATING
STEAM FROM WATER
John L. Boyen, Orinda, Calif., assignor to C-C Industries,
a corporation of California
Filed Jan. 22, 1964, Ser. No. 339,512
3 Claims. (Cl. 55—457)

This invention relates to an improved apparatus particularly adapted to the separation of low quality steam such as that produced by heat recovery boilers.

Recent improvements in gas turbines along with expanded demands for electrical energy in many industries has resulted in an increase in the use of such turbines for the generation of electrical energy at the immediate site of power consumption. This has occurred in small as well as medium and large industrial installations which also usually have a need for steam for various production processes and plant heating.

The gas turbine exhaust is a source of heat which represents a plant energy loss if not utilized. Such exhaust gases are usually in a relatively low temperature range, i.e., 980 to 1000° Fahrenheit, without supplementary firing, but are suitable for steam generation by various techniques in the field of heat recovery boilers.

Steam generation utilizing heat recovery boilers in modern industrial installations demand that such equipment be limited to an absolute minimum in space. This requirement alone has necessitated new developments in the field of such boilers prominent among which has been the "pancake stack" water tube type boiler operating on the forced recirculation principle. Among this type of boiler's unique features is its spiral pancake tube design which saves a great deal of space generally and eliminates conventional large boiler drums; these improvements permit the entire unit to be contained in a fraction of the space required by conventional waste heat boilers. A typical installation for example using conventional heat recovery boiler design capable of 5,000 pounds of steam per hour would entail an installation about 20 feet long, 8 feet wide and about 10 to 12 feet in height with an additional clear space requirement for tube removal of 16 feet. A comparable installation using the features of this invention in combination with a pancake stack type water tube boiler would only occupy a space of 7 feet by 9 feet by 6 feet with no additional requirement of clear space for tube removal.

However, even with optimum over-all boiler efficiency, steam generation by heat recovery boilers utilizing sources in the temperature range of 980 to 1000° Fahrenheit produces steam between 250° to 385° Fahrenheit at pressures in the range of 25 to 180 p.s.i.a. Typically, where a forced recirculation system is used which assures low steam impurities, the output from the boiler itself comprises a saturation steam and water mixture containing 50% excess water by volume, i.e., a mixture that is 40% steam and 60% water. Moreover, since the heat source of the gas turbine exhaust varies as the turbine output itself varies, there occurs periods of operation when the output from the heat recovery boiler tubes is substantially water liquid with little steam phase. Since the minimum acceptable steam quality for ordinary commercial purposes is 97%, the output from heat recovery boilers must be effectively separated in order to make the system useful.

Prior art boilers solve the problem of steam separation by multiple use of the large boiler drums required for receiving the boiler tube elements. Within these large boiler drums, conventional techniques of separation are employed involving various integral mechanical devices; such techniques include baffles or veins which cause abrupt changes of the direction of the steam and thus divert the moisture, a series of small unbaffled tubular separators, usually in conjunction with steps of steam purification, or combinations of all three. Such arrangements demand a minimum plant space as noted above far in excess of that available in present average industrial installations where gas turbine generated electricity is used. Moreover such prior art techniques are not feasible with the newest exhaust heat recovery boilers also described above because the spiral pancake water tube type design does not permit the use of large boiler drums and their attendant means of separation.

Thus, it is a principal object of the present invention to provide an effective steam separator, entirely apart from the boiler drum and tube elements themselves, operable in a minimum space by means of an improved cyclone design comprising a spiral baffling arrangement which produces a continuous flow of high quality steam, i.e., at least 98%, and separated water for use as preheated feed water in a forced recirculation system.

A feature of this invention is that the steam water mixture is continually directed by means of a descending spiral baffle until it reaches the lower region of the separator. This causes the water phase to be effectively separated from the steam by centrifugal action after which the steam phase rises abruptly away from the water phase leaving the separator at the upper portion under high cyclonic velocity imparted to it during its spiral acceleration and egress through a restricted outlet pipe.

Another feature is that the steam outlet orifice of limited diameter at the center of the top of the separator protrudes down into the chamber. Thus, any water which avoids separation and diversion at the bottom of the separator body and tends to proceed upward due to its high cyclonic velocity, and any water formed by condensation and carried along will collect upon the cylindrical portion of the walls of the separator and the dome and then flow back down around the top of the spiral baffling for eventual separation. Since the steam outlet orifice is of small diameter and protrudes below the top of the separator, none of the water phase is able to leave with the steam. Thus high quality steam is maintained with high overall operating efficiency for the unit.

Another feature of this invention is the acceleration of the steam water mixture leaving the boiler tubes in a directed path beyond entry into the cyclone separator by means of a flat convergent nozzle which enhances the effective centrifugal separation for achieving the aforementioned maximum quality of steam at a high and continuous rate of flow.

Still another feature is that feed water at saturation temperatures is introduced into the forced recirculation system by a series of protruding, radial, deflecting blades at the bottom of the separator directly adjacent to openings leading to the feed water reservoir tank directly below and integral with the separator.

A further advantage stemming from the water deflector blades is the dissipation of the water's high spiral velocity which prevents re-entry into the main separator chamber along its walls and the skirt portion of the spiral deflector means.

Other features and advantages will become apparent upon a reading of the detailed specification which follows.

Referring now to the drawings, FIGURE 1 shows a side elevational view with outer casing cut away to reveal internal details.

The essence of the present invention is the continuous separation in a closed system, of a vapor phase, such as steam, from the saturated liquid phase with which it is in equilibrium by means of an inital expansion and acceleration followed by a forced, directed course of motion of the entire fluid, i.e., all phases, through a guide helical acceleration path whereby the vapor phase is carried from the system, and the liquid is recirculated. The apparatus can best be understood by reference to the detailed specification below which describes a preferred embodiment of the present invention.

Figure 1:
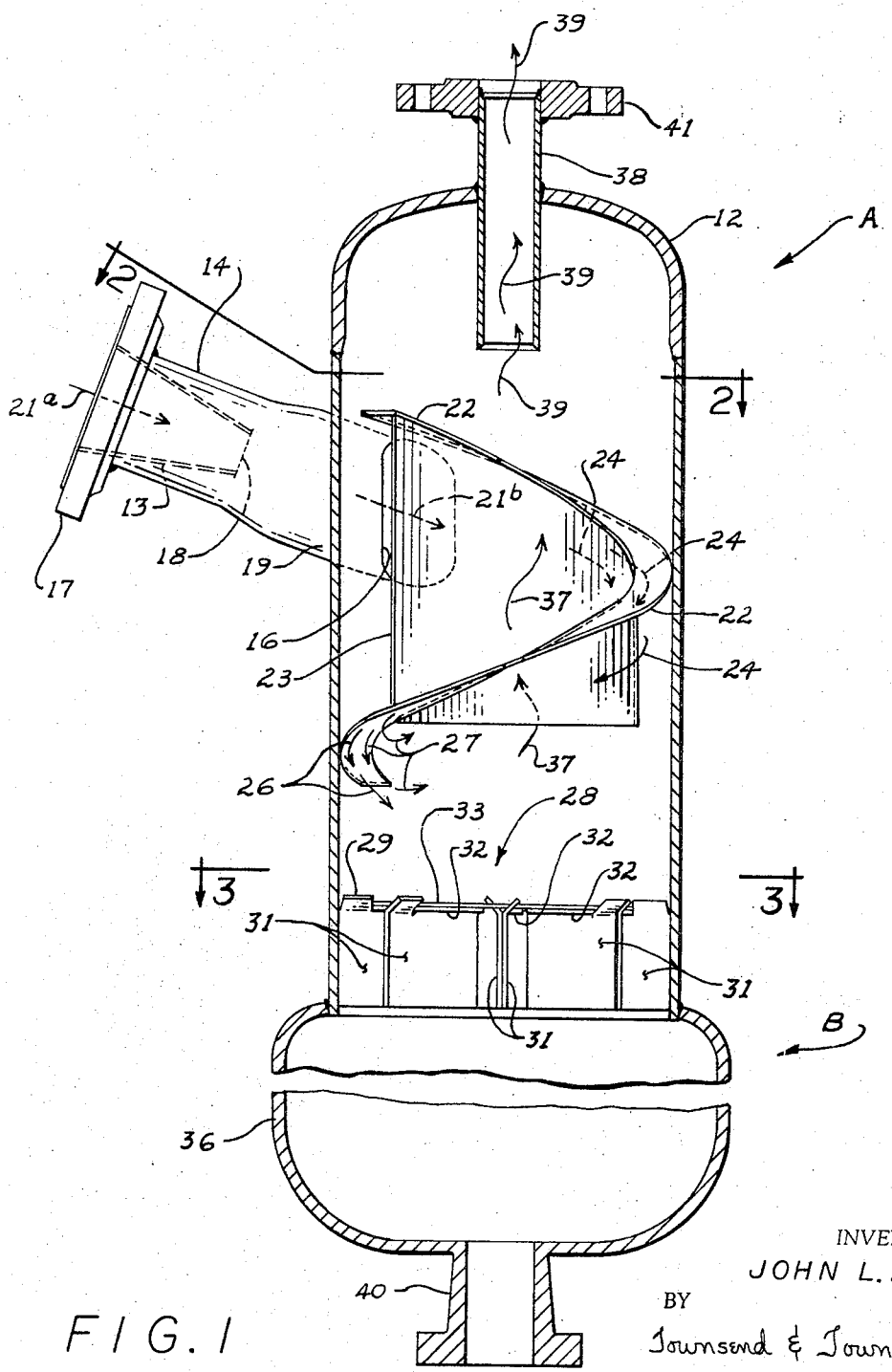

In FIGURE 1 the entire cyclone steam water separator is indicated generally at A with the integral feed water reservoir indicated generally at B.

Figure 2:
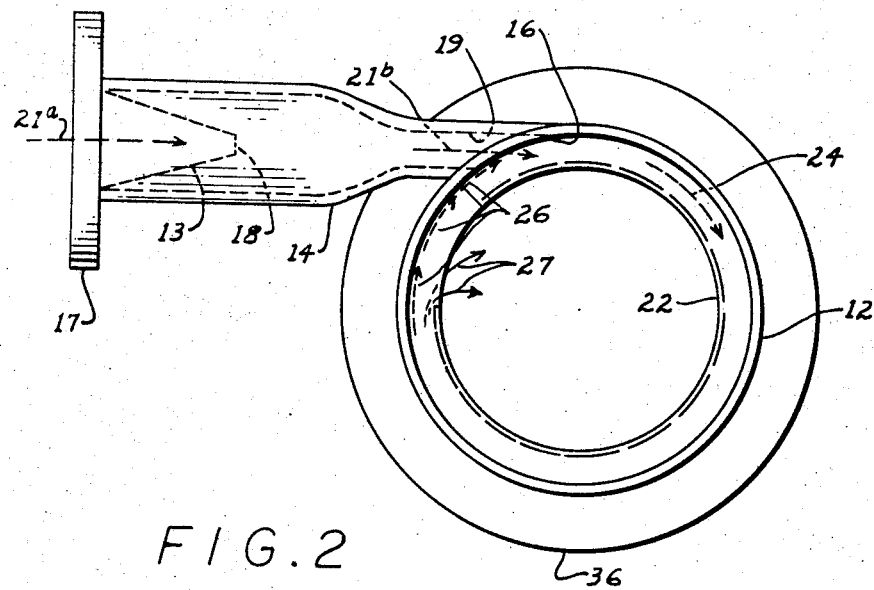
FIGURE 2 is a sectional plan view taken along line 2—2 as indicated in FIGURE 1.

A mixture of steam and water generated by a heat recovrey boiler is introduced to the interior of the separator shell 12 via the nozzle 13, as indicated by arrow 21a, and inlet conduit 14 connected at the opening 16 shown in FIGURES 1 and 2. Nozzle 13 has a frusto-conical base which is concentrically mounted in the enclosure 14 near inlet flange 17. The restricted end of nozzle 13 comprises elongate vertical orifice 18 which causes expansion and acceleration of the steam water fluid mixture at that point. Additional acceleration is achieved by the passage of the expanded fluid mixture through restriction 19 of fluid envelope 14 as the steam water mixture enters the separator shell, said entry indicated by arrow 21b in FIGURES 1 and 2.

Immediately upon entering the separator shell in the accelerated condition as described above, the fluid mixture is conveyed into a guided region or path bounded by helical deflector strip 22 and cylindrical skirt portion 23. As shown in FIG. 2, helical deflector strip 22 extends through a single convolution around the internal circumference of separator shell 12. In this manner the downward descent of the steam-water mixture is assured, but a more rapid rate of descent or free fall of the liquid fraction is not prevented by subsequent helical convolutions. The downward helical path through which the steam water mixture is now forced is indicated by arrows 24 in FIGURE 1. As the mixture proceeds in the indicated downward helical path, it is further accelerated and as a result, due to centrifugal action, the water or liquid phase of the mixture, because of its relatively greater density compared to the steam phase, tends to follow a cyclone path nearer the cylindrical walls of the separator shell, is indicated by arrows 26, while the vapor phase or dry steam follows a path nearer skirt portion 23 indicated by arrows 27. Thus the helical deflector and cylindrical skirt portion form a multiphase fluid classifier for the separation of the liquid and vapor phases of the saturated steam-water fluid mixture.

Figure 3:
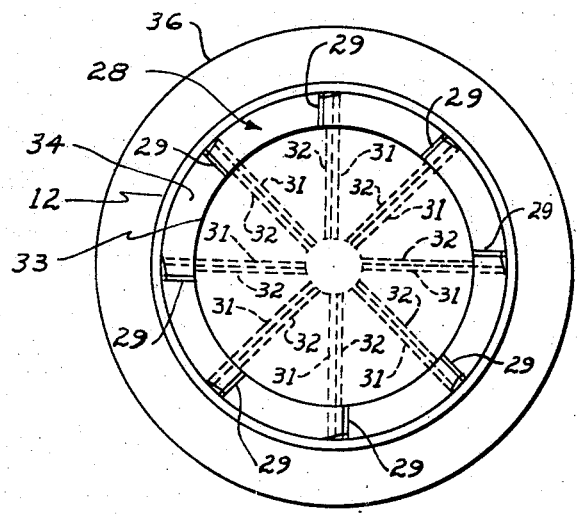
FIGURE 3 is a sectional plan view taken along the line 3—3 as indicated in FIGURE 1.

The liquid phase having separated out continues to circulate in a cyclonic whirl and due to gravity tends to drop within the separator shell coming into contact with a plurality of spaced deflector blades shown generally at 28 in FIG. 1. Each deflector blade comprises an upward protruding angular portion 29, a main body 31, and a lip 32 which is secured to the stiffening and positioning disc 33. As shown in FIGURE 3, the outside diameter of disc 33 is less than the inside diameter of shell 12 leaving annular space 34 between 12 and 33 so that when the water phase mentioned above strikes portions 29 of the deflector blades said phase is caused to flow through annular space 34 into the reservoir indicated generally at B and at the same time the liquid's cyclonic circulating force is caused to be diminished nearly completely by interception of the plurality of angular portions 29.

Reservoir B comprises the shaped closed wall 36 which is integral and continuously attached to separator shell 12 as indicated in FIGURE 1. At the bottom of the feed water reservoir tank is flanged opening 40 which provides for the recirculation of the hot water back into the heat recovery boiler system.

Due to its lesser density, the steam phase of the separated mixture, described above following paths indicated by arrows 27, proceeds in an ascending helical path indicated by arrows 37 in FIG. 1. Also because of its lower density, once free of the restraining influence of skirt portion 23, the ascending steam phase follows a smaller radius cyclonic path than during its downward acceleration. Moreover since there is a tendency for the steam to seek the egress path presented by outlet pipe 38, the cyclonic path followed by the steam as it nears the outlet is further reduced thus giving the steam additional acceleration as it leaves past outlet flange 41 by the path indicated by arrows 39 in FIG. 1 and thence to piping to various processes requiring the steam thus produced and separated.

Because the deflector blades cannot operate to divert all of the water, a certain amount of water particles tend to continue in a high velocity cyclonic path and, because of reduced size and mass and centrifugal action, tend to reach into the upper portions of the separator shell along with additional liquid caused by some condensation of the steam phase; however, since these particles continue in a helical path, the combination of their greater mass with respect to the steam phase and centrifugal action causes such particles to adhere to the cylindrical shell of the upper portion of the separator. Since outlet pipe 38 projects down into the dome of separator shell 12 into the main portion, the water accumulation described above is unable to exit with the steam and eventually falls by gravity along the upper cylindrical shell portion of the body of the separator, downwardly over the upper surface of helical strip 22 and eventually down through annular opening 34 into the hot feed water reservoir tank below.

Although the foregoing is illustrative of one embodiment of the apparatus which has been described in some detail for purposes of clarity and understanding, it is understood that certain changes and modifications may be made within the spirit of the invention and scope of the appended claims.

I claim:

1. Apparatus for separating steam and water from a fluid mixture of such constituents comprising: a fluid-impervious upright cylindrical tubular housing having upper and lower ends; a partial cylinder formed by cutting away the upper portion of a cylinder so as to define an upper helical boundary, said partial cylinder being co-axially mounted within said housing and spaced from the inner surface of the side wall of said tubular housing so as to define an annular space therebetween, said partial cylinder being spaced from the upper and lower ends of said housing; a downwardly extending helical deflector strip spanning said annular space and extending laterally from said cylinder helical upper boundary into contact with said surface of said tubular housing along its length and defining the upper limit of a descending helical path, said helical deflector strip extending through substantially a single convolution about said cylinder along the helical upper boundary from the top to the bottom of said cylinder to allow free gravitational movement of said mixture below said strip; a downwardly directed tangential inlet means connected to said tubular housing side wall adjacent and below the upper end of said strip for introducing a steam-water mixture into said annular space below the upper end of the strip and above the lower end of said strip so that said strip will act as an upper fluid guide; means spaced beneath said cylinder and above said lower end for further separation of said mixture, said means comprising a disc having a plurality of peripheral angularly disposed deflector vanes, liquid outlet means disposed through said lower end of said tubular housing, outlet means spaced from and of smaller cross-section than said cylinder disposed through said upper end of said tubular housing for receiving steam.

2. Apparatus in accordance with claim 1 wherein said outlet means in the upper end of the tubular housing is a co-axially aligned cylindrical conduit extending into said housing.

3. Apparatus in accordance with claim 1 wherein said inlet means comprises a frusto-conical nozzle means, whereby the incoming mixture is accelerated before entering said housing.

References Cited

UNITED STATES PATENTS

| | | | |
|---|---|---|---|
| 323,891 | 8/1885 | Stratton | 55—459 |
| 1,066,704 | 7/1913 | Brassert | 55—391 |
| 1,393,066 | 10/1921 | Atkinson | 55—458 |
| 2,106,589 | 1/1938 | Bigger et al. | 55—205 |
| 2,229,860 | 1/1941 | McCurdy | 55—399 |
| 2,300,129 | 10/1942 | McCurdy | 55—457 |
| 2,394,605 | 2/1946 | Friedman | 55—459 |
| 2,754,970 | 7/1956 | Ross | 55—459 |
| 2,869,677 | 1/1959 | Yellott et al. | 55—449 |
| 3,151,961 | 10/1964 | Blackmore et al. | 55—205 |
| 3,161,490 | 12/1964 | Dudek | 55—205 |
| 3,200,568 | 8/1965 | McNeil | 55—459 |
| 3,201,919 | 8/1965 | Long | 55—204 |

FOREIGN PATENTS

| | | |
|---|---|---|
| 1,078,998 | 4/1960 | Germany. |
| 151,675 | 8/1963 | U.S.S.R. |

HARRY B. THORNTON, *Primary Examiner.*

B. NOZICK, *Assistant Examiner.*